United States Patent
Nonogaki

(10) Patent No.: US 6,183,674 B1
(45) Date of Patent: *Feb. 6, 2001

(54) MANUFACTURING METHOD OF DIAPHRAGM FOR USE IN ELECTROACOUSTIC TRANSDUCERS

(75) Inventor: Akihiro Nonogaki, Akishima (JP)

(73) Assignee: Foster Electric Co., Ltd., Tokyo (JP)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/296,367

(22) Filed: Apr. 22, 1999

(30) Foreign Application Priority Data

Oct. 7, 1998 (JP) .................................. 10-284950

(51) Int. Cl.[7] ............................ B29C 44/06; B29C 45/14; B29C 45/16
(52) U.S. Cl. .......................... 264/46.4; 264/138; 264/250; 264/266; 264/321; 264/328.7
(58) Field of Search ................... 264/46.4, 252, 264/138, 266, 328.7, 321, 250

(56) References Cited

U.S. PATENT DOCUMENTS

| 5,650,105 | * | 7/1997 | Yocum | 264/252 |
| 5,705,108 | | 1/1998 | Nonogaki . | |
| 5,793,002 | * | 8/1998 | Sato et al. | 181/169 |

FOREIGN PATENT DOCUMENTS

| 63-42300 | 2/1988 | (JP) . |
| 2-239799 | 9/1990 | (JP) . |
| 9-102998 | 4/1997 | (JP) . |

* cited by examiner

Primary Examiner—Allan R. Kuhns
(74) Attorney, Agent, or Firm—Lynn & Lynn

(57) ABSTRACT

A manufacturing method of diaphragms for use in electroacoustic transducers simultaneously joins an edge and a diaphragm body upon molding the diaphragm body through an injection molding with a set of mating molds for forming the diaphragm body, with the edge of a cell-structure disposed on one of the mating molds, the edge being preliminarily molded and cut into a predetermined shape, and with the other mold mated with the one mold.

6 Claims, 5 Drawing Sheets

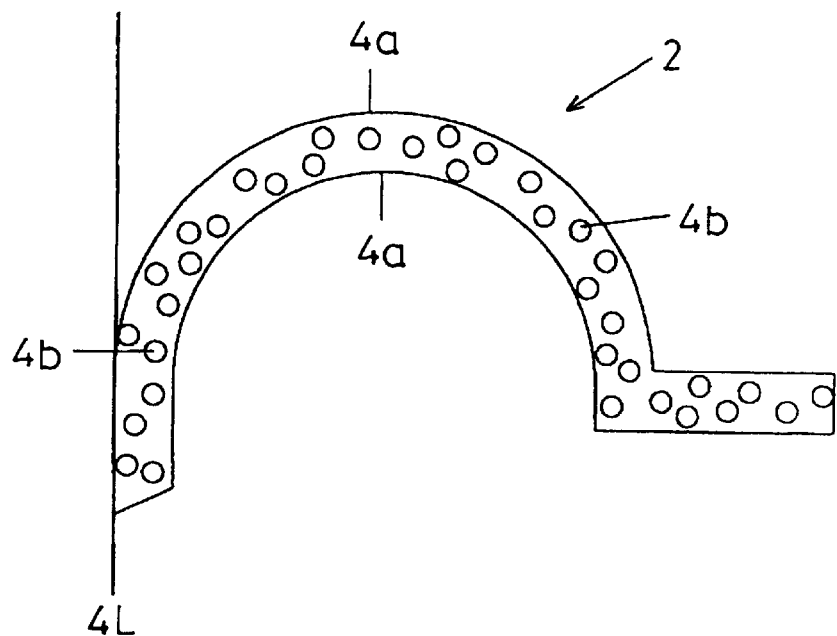
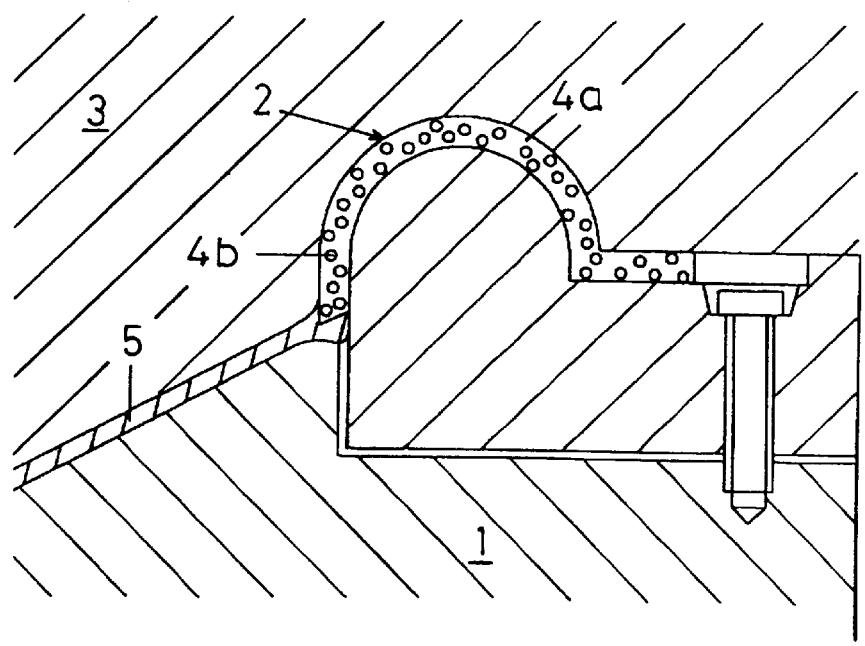

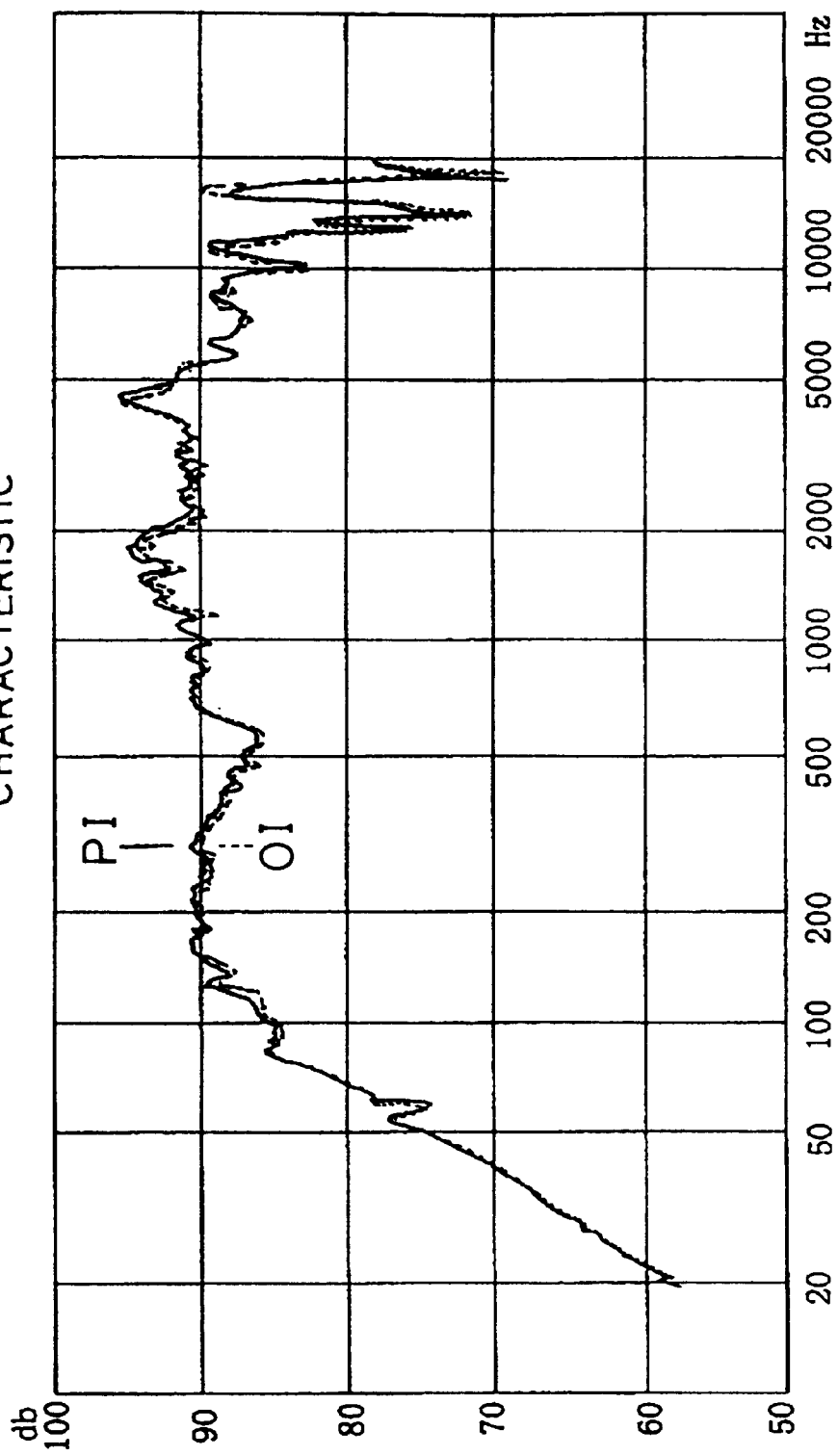

MANUFACTURING METHOD OF DIAPHRAGM FOR USE IN ELECTROACOUSTIC TRANSDUCERS

BACKGROUND OF THE INVENTION

This invention relates to a method for manufacturing diaphragms for use in such electroacoustic transducers as loudspeakers, microphones and the like or, more specifically, to such manufacturing method in which an edge of a cell structure is simultaneously joined with a diaphragm body upon molding the diaphragm body through in injection.

DESCRIPTION OF RELATED ART

Technical conditions desired for the diaphragm for use in such electroacoustic transducers as the loudspeakers and the like will be that the diaphragm comprises a diaphragm body which is light in weight and having a proper internal loss property showing a high elasticity and an edge which is light in weight and high in the internal loss to show an optimum linearity, and that the diaphragm is excellent in the durability, easy to manufacture, consistent in the quality of products, and still inexpensive. In recent years, further, the waterproofness has become one of important characteristics of the diaphragms mainly for use on vehicles.

In order to realize the foregoing technical conditions, there have been suggested and utilized various types of free-edge diaphragms. In particular, a diaphragm structure obtained by simultaneously molding and joining the diaphragm body and edge with the injection molding utilized has been suggested in various types in view that the structure is capable of retaining excellent properties of synthetic resin diaphragms and of being provided economically, whereas almost none of them could realize the foregoing technical conditions at satisfiable level.

In Japanese Patent Laid-Open Publication No. 63-42300, for example, there has been suggested a diaphragm in which an edge which is trimming-processed into a predetermined shape is preliminarily inserted in a pair of molds for injection-molding and is joined simultaneously with the injection molding of the diaphragm body to be integralized therewith. In the case of such diaphragm shown specifically in this publication, the edge is joined with the diaphragm body by causing an inner periphery of the edge to enter substantially in the center of the thickness of the diaphragm body. Since in this joining structure the position of joining part of the edge cannot be always constant as it depends on the conditions of the injection, so as to cause many problems to arise, such that the edge is broken within molding cavity in the worst case, and that such broken piece is caused to be simultaneously molded and joined, and the diaphragm of this publication has been far from being realized.

In Japanese Patent Laid-Open Publication No. 2-239799, there has been suggested an improvement in the foregoing problems of Publication 63-42300. Because this improvement employs as the edge material a woven fabric of cotton, silk or the like of a chemical fiber having the heat resistance, however, there has been still left a problem in respect of the excellent linearity to be obtained with the optimum internal loss as well as the waterproofness to be attained.

Further, there has been suggested a simultaneous injection molding and joining of an edge of solid elastomer (not-foamed yet) with the diaphragm body which is preliminarily molded into a predetermined shape and disposed in the molds. In this case, however, a residual stress applied to the edge due mainly to the constriction after the molding cannot be well relieved, so as to cause such a problem that a remarkable deformation occurs. In the event when the solid material (not-foamed yet) is used as the edge, further, there arises a problem that a specific tone occurs due to such material and an abnormal sound is generated, in particular, upon receiving a large input.

In order to remove the problem of the deformation of edge, a simultaneous joining of the edge in the form of a foam rubber with the molding of diaphragm body has been suggested in Japanese Patent Laid-Open Publication No. 9-102998 which is assigned to the same assignee as the present case and to which U.S. Pat. No. 5,705,108 corresponds. In this simultaneous molding and joining, it is essential that the diaphragm body has a sufficient heat resistance with respect to a molding temperature of the edge. In an event where such synthetic resin as polypropylene or the like which is relatively low in the thermal deformation temperature is employed for the diaphragm body, therefore, it becomes necessary to set the molding temperature of the edge to be lower, and there arises a problem that the manufacture is time-consuming so as to result in an increment of costs.

SUMMARY OF THE INVENTION

It is an object of the present invention to provide a manufacturing method which can eliminate the foregoing problems, and is capable of obtaining a diaphragm which is light in weight, high in the elasticity, excellent in the linearity, causing no abnormal sound to be induced even upon the large input, less deformable and still inexpensive.

According to the present invention, the above object can be realized by a manufacturing method of the diaphragm which is manufactured through an injection molding, characterized in that an edge of a cell structure, preliminarily molded and cut into a predetermined shape is preliminarily disposed on one of a pair of mating molds for injection molding, the other mold is disposed thereon with a predetermined gap provided therebetween, and thereafter the edge and diaphragm body are simultaneously joined with an injection-molding of the diaphragm body. In this event, it is preferable that open cells of the cell structure are included in joining surface of the edge with respect to the diaphragm body.

Other objects and advantages of the present invention shall become clear as the description of the invention advances as detailed with reference to working aspects of the invention as shown in accompanying drawings.

BRIEF DESCRIPTION OF THE DRAWINGS

FIG. 3 is a schematic sectioned view as magnified of the edge after being cut in the manufacturing method of the present invention;

FIG. 4 is an explanatory view for the step of simultaneous molding in the manufacturing method of the present invention;

FIG. 7 is a diagram showing a comparison in the frequency-sound pressure characteristics of the diaphragm according to the present invention with a diaphragm according to conventional method.

While the present invention shall now be described with reference to the working aspects shown in the accompanying drawings, it should be appreciated that the intention is not to limit the invention only to these aspects shown but rather to include all alterations, modifications and equivalent arrangements possible within the scope of appended claims.

DETAILED DESCRIPTION OF THE PREFERRED EMBODIMENTS

According to the method of the present invention, there can be provided a diaphragm for use in electroacoustic transducers, in which the diaphragm body made of a synthetic resin is firmly joined with the edge having a cell structure.

For the material of the edge, it is optimum to employ a foam rubber in respect of a use in which a high reliability is demanded to be shown in the waterproofness, weather resistance and the like. It is also a feature of the present invention to employ, as a main component of the foam rubber, a vulcanized rubber, thermoplastic elastomer or the like. As the vulcanized rubber, one can be selected from the group consisting of styrene-butadiene rubber, nytril-butadiene rubber, ethylene-propylene terpolymer rubber, isoprene rubber, chloroprene rubber, isobutylene-isoprene rubber, ethylene-propylene, and silicone rubber. For the thermoplastic elastomer, one can be selected from the group consisting of polyethylenes, polystyrenes, polyolefins, polyurethanes, polyesters, polyamides, polybutadienes, ethylene-vinyl acetates, and polyvinyl chloride.

A foaming agent to be mixed should preferably be one of a gas generating type with a thermal decomposition, and a resultant foamed edge molded should optimumly be of a specific gravity in a range of 0.07–1.2. As another material of the edge, a foamed urethane may be employed.

The cell structure of the edge is a cellular structure constituting a foamed member, in which cells are formed respectively with a cell wall, while the cellular structure includes one of closed cells in which each cell is completely surrounded by the cell wall and the other of interconnected cells in which the cells are respectively not fully enclosed by the cell wall but communicating with adjacent cell or cells, and the present invention adopts the one of closed cells or of a mixed type of the closed cells and interconnected cells.

EXAMPLES

First, an edge obtained by molding and cutting an edge of the cell structure into a predetermined shape was disposed preliminarily on one mold 1 of a pair of mating molds for injection molding a diaphragm body, the other mold 3 was mated with the mold 1, and the edge was joined with the diaphragm body simultaneously with an injection molding of the diaphragm body with a synthetic resin into a cavity between the mated molds 1 and 3.

Figure 1:
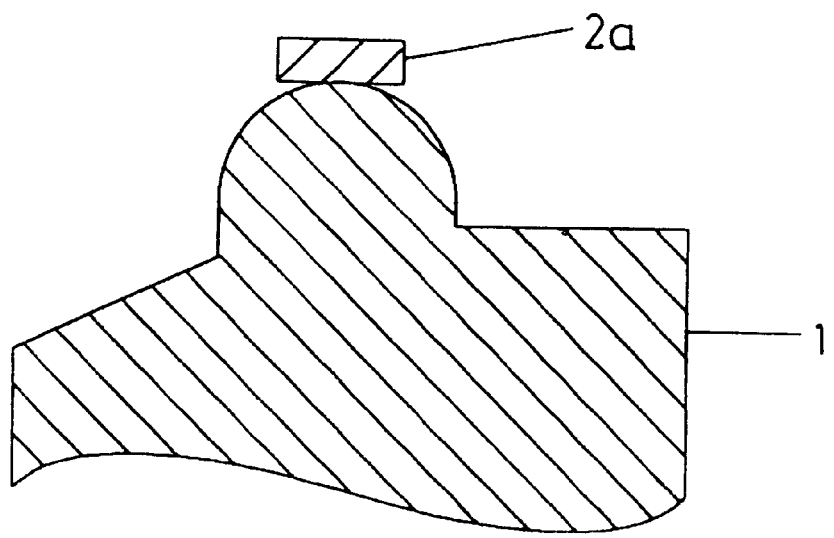
FIGS. 1 and 2 respectively show steps for making the edge in the manufacturing method of diaphragms for use in electroacoustic transducers according to the present invention.
Figure 2:
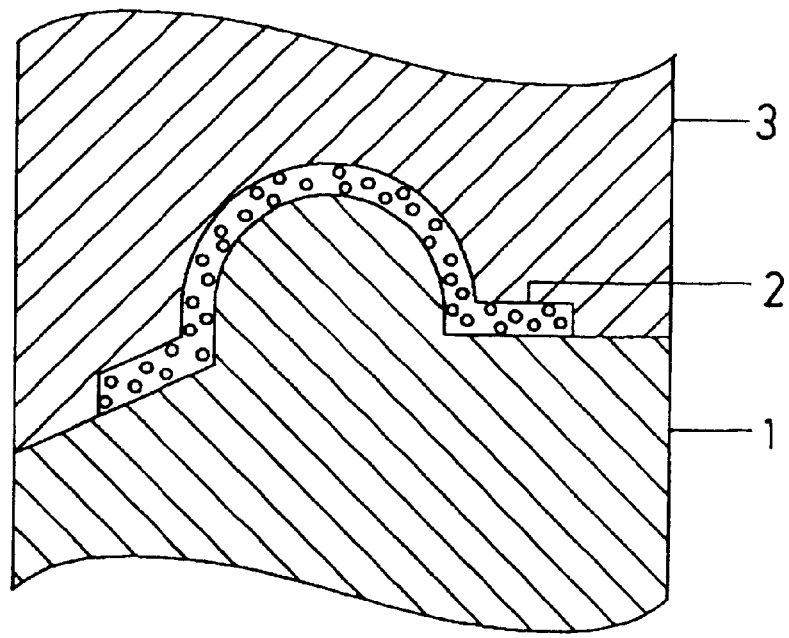

Referring to the above more specifically, the edge base 2a consisting of an intimate rubber mixture of, for example, ethylene-propylene terpolymer rubber with a vulcanizing agent, foaming agent and the like added was formed into a predetermined shape, such as a strip shape in the present instance and is placed on a mold 1 of a pair of mating molds, as shown in FIG. 1. Thereafter, as shown in FIG. 2, the edge base 2a of the intimate rubber mixture was held by the other mold 3 with respect to the mating mold 1 and was molded under a heat and a pressure, and an edge 2 of a foamed and vulcanized rubber in a predetermined shape was obtained. At this time, the edge 2 was prepared under conditions of a pressure of 4 kg/cm$^2$, a temperature of 200° C. and for 60 seconds.

If required, the edge 2 prepared with the foamed and vulcanized rubber as in the above is further cut into a predetermined shape. In FIG. 3, the edge 2 is shown as magnified, from which it should be appreciated that the edge 2 has skin layers 4a and cell part 4b, forming a closed cell member. Further, this edge 2 is cut along a shearing line 4L, and a diaphragm body 5 is joined to such cut portion of the edge 2, with a material 5a of the body 5 incorporated into the edge 2, as shown in FIG. 4, so as to attain a firmer joint. It is seen further that, in the interior of the cell part 4b, the closed cells are present to be contributive to a reduction of weight of the edge 2.

Next, the joining of the edge 2 with respect to the diaphragm body 5 shall be described further in detail.

The edge 2 of the foamed and vulcanized rubber was placed at a proper position in the one mold 1 of the pair of mating molds for the injection molding of predetermined shape and mounted to as injection molding machine not shown, and the edge 2 was secured to the one mold 1 by means of a vacuum absorption device not shown but mounted to the molds. The one mold 1 was then moved to a predetermined position, the other mold 3 was placed on the mold 1 with a gap left between them, a material made by adding 30% of mica to polypropylene (for example, a product MRP230-LL2B by KURALAY) was injected into the gap under the conditions of a resin temperature of 230° C., an injecting pressure of 150 Mpa, a charging time of 0.05 seconds, a mold temperature of 60° C. and a cooling time of 10 seconds, and the diaphragm body 5 was joined, at its outer peripheral edge and upon being molded, mainly to the cut inner periphery of the edge 2. This joining was so made as to perform a firm adhesion by means of mutual fusion bonding of both materials. At this time, the molding material of the diaphragm body 5 was forced to enter into the cell part 4b at the inner peripheral part of the edge 2, to which part the gap of the molds was made to continue, and the firm adhesion was attained between the edge and the diaphragm body.

In the above case, it has been found that, with respect to the diaphragm body 5 made of such well known olefin resin as polypropylene which has been widely employed from a view point of the specific gravity, internal loss and so on, the same material as that for the diaphragm body and including polymers of hydrocarbon olefins should optimumly be employed for the edge base 2a in view of the adhesion properties and reliability.

Further, it is enabled to perform the molding under a lower pressure by rendering the molding gap to be larger than that primarily intended for the injection molding of the diaphragm body, and carrying out the pressing substantially concurrently with completion of the injection molding, whereby the occurrence of deformation in the edge 2 can be remarkably reduced, and a more stable production of the diaphragm is made possible.

Figure 5:
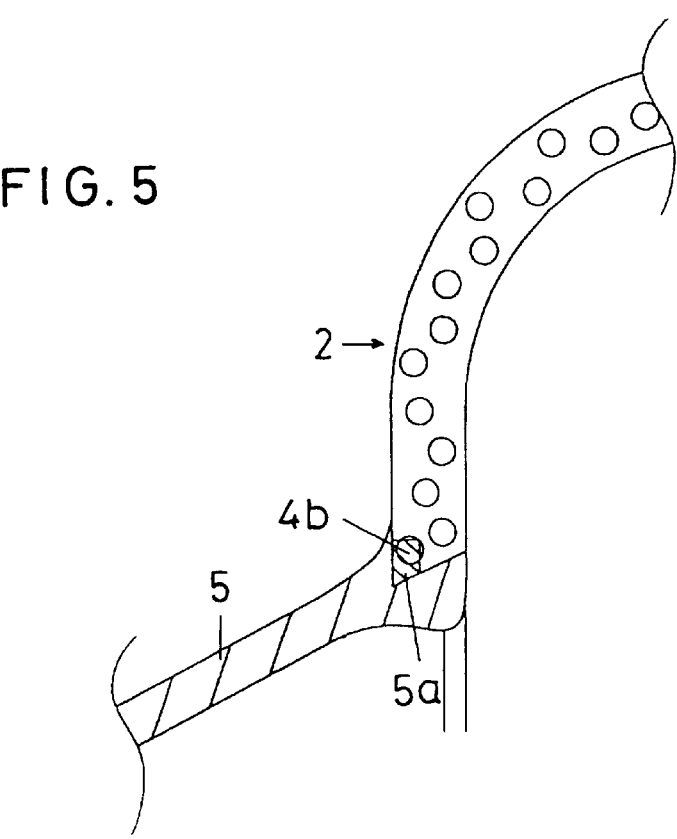
FIG. 5 is a fragmentary sectioned view as magnified at a joined part of the diaphragm body and edge according to the method of the present invention.

On the other hand, FIGS. 6a–6d show various other aspects of the joining between the edge 2 and the diaphragm body 5, in which, in concrete, a hatched portion in the respective drawings shows a state in which the material 5a of the diaphragm is caused to enter into the cell part 4b of the edge 2. That is, while in FIGS. 3–5 the edge 2 is cut along the line 4L just at start-rising part of the edge and is joined at this cut part with the diaphragm body 5, the respective aspects in FIGS. 6a–6d show that the edge 2 is cut at an intermediate position of inner flat part to leave an inward flat portion and is joined at inner periphery of such inner flat part with the diaphragm body 5.

Next, a performance test of the diaphragm for use in the electroacoustic transducer according to the present invention shall be described. The foregoing diaphragm manufactured according to the present invention as well as a known diaphragm of a joint employing an adhesive were respectively incorporated into loudspeakers of the same diameter of 13 cm, and the frequency-sound pressure characteristics were measured with respect to both diaphragms, result of which is as shown in FIG. 7. It has been then found that, even the inventive diaphragm is lighter by about 16% (1.0 g) in weight than the known diaphragm, the characteristic curve in solid line of the diaphragm PI according to the present invention shows substantially the same excellent frequency-sound pressure characteristic of the same level or even better level than the characteristic curve in broken line of the known diaphragm PI.

Figure 8:
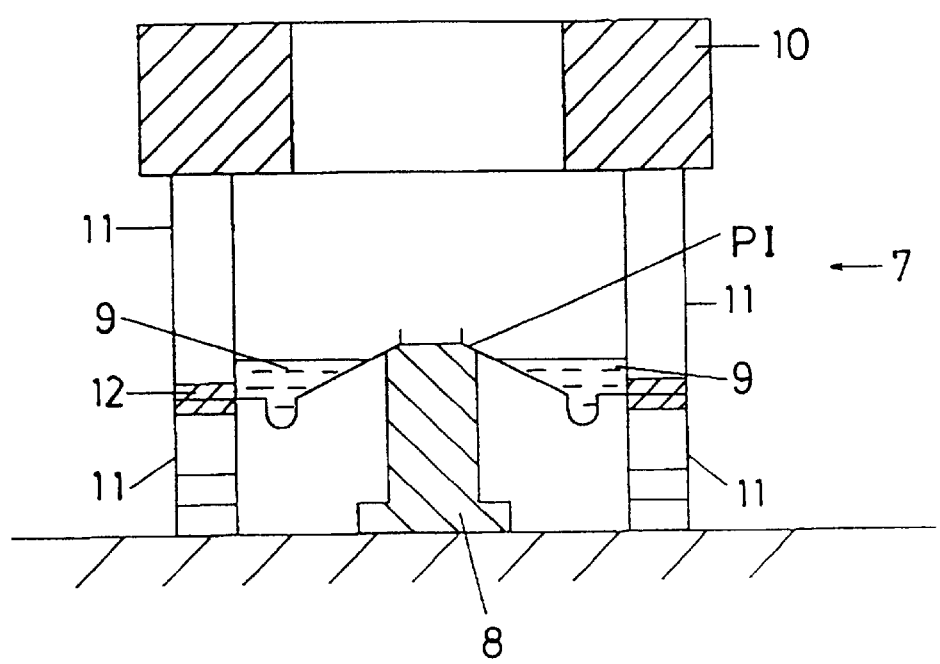
FIG. 8 is an explanatory view for a test of waterproofness in respect of the diaphragm according to the present invention.
Figure 6A:
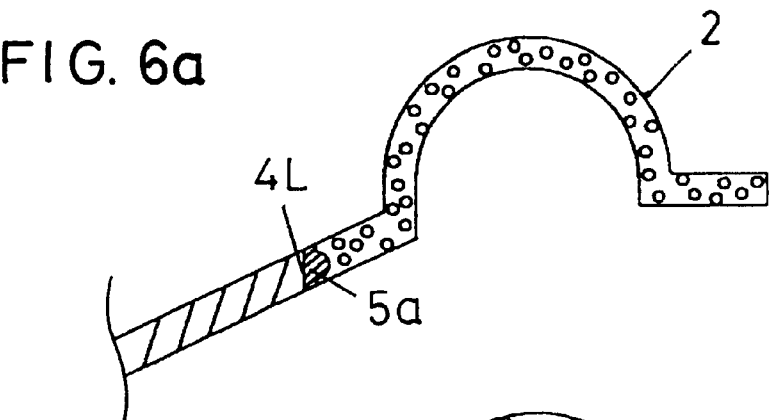
FIGS. 6a through 6d are explanatory sectioned views for the joining aspects between the diaphragm body and the edge, respectively.
Figure 6B:
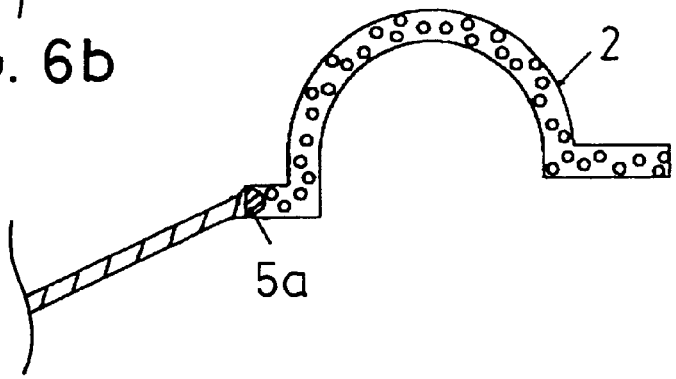
Figure 6C:
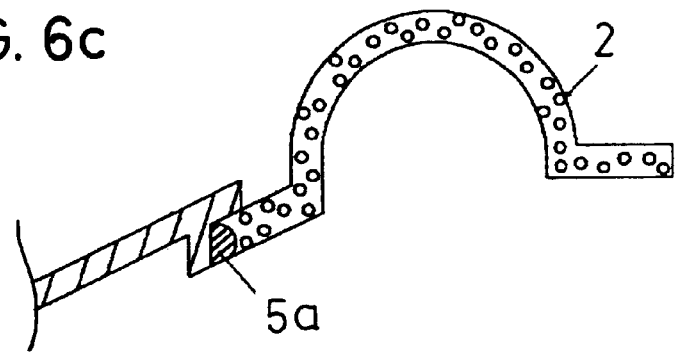
Figure 6D:
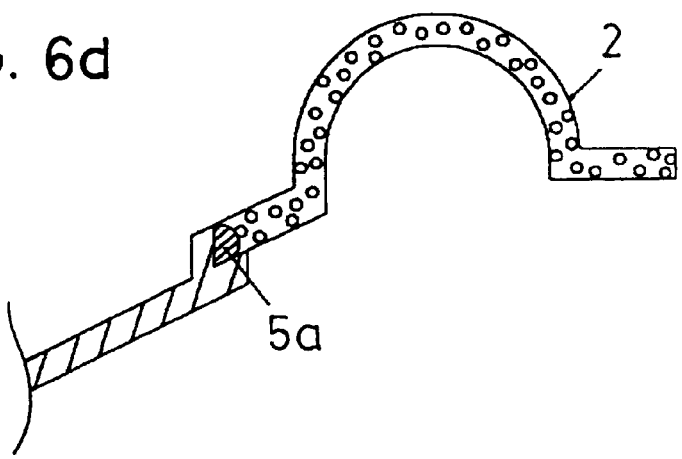

Further, a waterproofness test of the diaphragm for use in the electroacoustic transducer according to the present invention shall be described. In this case, as shown in FIG. 8, the diaphragm PI of the present invention was supported in a waterproofness test device 7 through a diaphragm supporter 8, with reverse surface of the diaphragm PI disposed upside, a certain amount of water 9 was preserved on the reverse surface, the diaphragm was shelved in this state for 48 hours, and the waterproofness was evaluated. For this waterproofness test device 7, one in which a cylindrical body 11 of transparent acrylic resin and carrying thereon a weight 10 was provided with a packing 12 for holding an outer periphery of the diaphragm PI was employed.

As a result, the inventive diaphragm PI as well as the known diaphragm OI have shown both an excellent waterproofness without showing any exudation of water or any deformation even after the shelf test for 48 hours.

Further, the adhesion strength of the joining part in the inventive and known diaphragms was evaluated in respect of the shearing strength by means of a tensile testing, as a result of which the inventive diaphragm has shown a higher adhesion strength than the known diaphragm, as shown in a following Table:

TABLE

| | Shearing Adhesion Tests of Joining Part (kg/cm$^2$) |
|---|---|
| Inventive Diaphragm: | 2.08 |
| Known Diaphragm: | 1.48 |

Referring to collective performance, it has been able to evaluate the inventive product to be an excellent diaphragm, as showing the performance more than equal to that of the known diaphragm. In the manufacturing method, further, the steps of applying the adhesive and of engaging both members with each other for adhesion can be omitted, and it has been able to gain confidence that the method can be more economized.

While in the foregoing the foam rubber has been described as the material for the edge, it is possible to employ foam urethane optimumly in an event when excellent acoustic performance different from that of foam rubber is intended to be utilized, since foam urethane attains the same level or even higher level of minimization in weight and still shows excellent performance different from foam rubber, while foam urethane is inferior than foam rubber in such reliability as the waterproofness and weathering characteristics, so as to be limited in the environment of use.

What is claimed is:

1. A manufacturing method of diaphragms for use in electroacoustic transducers, comprising the steps of:

furnishing an edge of a cell structure that is preliminarily molded and cut into a predetermined shape;

disposing the edge furnished on one of a pair of mating molds for an injection molding of the diaphragm;

placing the other mold on the one mold with the preliminarily prepared edge disposed thereon, while leaving between both molds a predetermined gap required for molding a diaphragm body; and injecting into the gap between the molds a molding resin material for the diaphragm body to mold the body and to simultaneously join the outer periphery of the diaphragm body being injection-molded at least with the inner periphery of the edge preliminarily molded.

2. The method according to claim 1 wherein at least part of a joining surface at the inner periphery of the edge of the cell structure with the diaphragm body being molded is formed with a cell part of the cell-structure edge.

3. The method according to claim 1 wherein, in the injecting step, the gap between the molds is once made larger than the predetermined gap at least during the injection, and the injected material is pressed after the injection at the latest for molding the diaphragm body to be of the predetermined thickness.

4. The method according to claim 1 wherein the edge of the cell structure consists of a foam rubber.

5. The method according to claim 1 wherein the edge of the cell structure comprises a foamed urethane.

6. The method according to claim 1 wherein the edge and diaphragm body both contain in their components a polymer of hydrocarbon olefins.

* * * * *